G. H. PHILLIPPI.
BUNGS FOR BARRELS.
No. 194,721.  Patented Aug. 28, 1877.
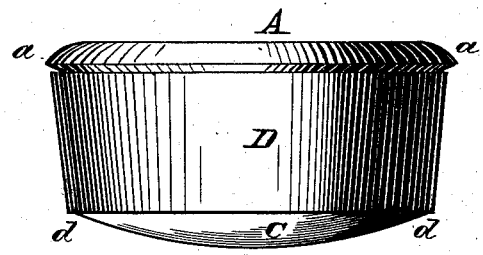
Fig. 1.
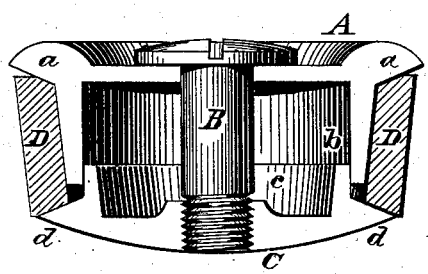 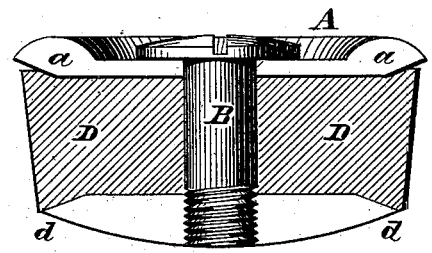
Fig. 2.  Fig. 3.
Witnesses:  Inventor:
Frank Hirsch  G. H. Phillippi,
Chas. Brosart  by Michael P. Stark
  his Attorney.

UNITED STATES PATENT OFFICE.

GEORGE H. PHILLIPPI, OF BUFFALO, NEW YORK, ASSIGNOR OF ONE-HALF HIS RIGHT TO GEORGE W. PHILLIPPI, OF SAME PLACE.

IMPROVEMENT IN BUNGS FOR BARRELS.

Specification forming part of Letters Patent No. 194,721, dated August 28, 1877; application filed July 31, 1877.

*To all whom it may concern:*

Be it known that I, GEORGE HENRY PHILLIPPI, of Buffalo, in the county of Erie and State of New York, have invented certain new and useful Improvements on a Bung for Barrels; and I do hereby declare that the following description of my said invention, taken in connection with the accompanying sheet of drawings, forms a full, clear, and exact specification, which will enable others skilled in the art to which it appertains to make and use the same.

This invention has reference to improvements on barrel-bungs; and it consists in the arrangement of parts and details of construction, as hereinafter first fully described, and then pointed out in the claim.

In the drawings heretofore mentioned, Figure 1 is a side elevation of a bung of my improved construction. Fig. 2 is a transverse sectional elevation; and Fig. 3, a similar view of a slightly-modified form of the device, illustrated in Figs. 1 and 2.

Like letters of reference indicate similar parts in all the figures.

A is the body of my improved bung, consisting of a cast-iron flange or plate, *a*, having an annular ring or projection, *b*, of less diameter than that of said flange *a*. This flange is flared from its junction with the ring *b*, and it has centrally an aperture for the passage of a bolt, B. C is a gland or follower, constructed very much like the body A in respect to the flange and annular ring, except that it is smaller in size, so that the ring *c* fits the interior of the ring *b*. D is an annular ring, of rubber or other elastic or flexible material, placed upon the ring *b*, and of an external diameter, fitting the usual bung-holes in barrels, casks, &c. The annular ring *b* is tapering, being largest at the flange *a*, so that the rubber D, when placed thereupon, assumes a corresponding shape, and thereby the contour of the bung-hole.

The screw or bolt B has a thread fitting an internal thread in the gland C, so that when it is screwed up it draws the gland C toward the body A, and, thereby compressing the rubber D, swells the same and increases its external diameter, the flaring parts on the gland C and body A assisting therein.

To insert this bung into a barrel, the screw B is somewhat released or slackened, when the rubber C, contracting in consequence, fits a good fit in the bung-hole. Now the screw B is screwed up by means of a suitable wrench, and thereby caused to swell the rubber D, as hereinbefore stated, and thus wedges the bung firmly into the hole.

It is evident that this bung can be manufactured in various sizes, so as to fit the different bung-holes.

In Fig. 3 I have illustrated a slightly-modified form of my bung, in which the annular rings *b* and *c* are dispensed with, and the rubber D made of a disk, having a central aperture for the passage of the bolt B, the flanges *a* and *d* being made flaring, to force the rubber outward, the same as in the bung heretofore described.

A bung made in this manner will answer the purpose of that shown in Fig. 2 in every respect, but the rubber being larger in bulk, and far more expensive than cast-iron, it is more expensive to manufacture.

The metallic parts of my bung may be coated with paint, varnish, zinc, and other substances or metals neutral to acids, &c., to prevent any corrosion of the same when employed in casks containing liquids having a tendency to affect the said metal employed.

Having thus fully described my invention, I desire to secure to me by Letters Patent of the United States—

The combination, with the body A, having the flaring flange *a* and tapering annular ring *b*, of the gland C, provided with the flaring flange *d* and annular ring *c*, and the rubber packing-ring D, the parts being arranged to operate for expanding said rubber, substantially as and for the use and purpose stated.

In testimony that I claim the foregoing as my invention I have hereto set my hand and affixed my seal in the presence of two subscribing witnesses.

G. HENRY PHILLIPPI. [L. S.]

Attest:
  MICHAEL J. STARK,
  FRANK HIRSCH.